T. V. BUCKWALTER.
BRAKING MECHANISM.
APPLICATION FILED AUG. 18, 1914.

1,135,097.

Patented Apr. 13, 1915.
2 SHEETS—SHEET 1.

WITNESSES:

INVENTOR:
Tracy V. Buckwalter,
BY
Charles N. Butler
ATTORNEY.

T. V. BUCKWALTER.
BRAKING MECHANISM.
APPLICATION FILED AUG. 18, 1914.

1,135,097.

Patented Apr. 13, 1915.
2 SHEETS—SHEET 2.

WITNESSES:

INVENTOR:
Tracy V. Buckwalter,
BY Charles N. Butler
ATTORNEY.

UNITED STATES PATENT OFFICE.

TRACY V. BUCKWALTER, OF ALTOONA, PENNSYLVANIA.

BRAKING MECHANISM.

1,135,097.            Specification of Letters Patent.    Patented Apr. 13, 1915.

Application filed August 18, 1914. Serial No. 857,304.

*To all whom it may concern:*

Be it known that I, TRACY V. BUCKWALTER, a citizen of the United States, residing at Altoona, in the county of Blair and State of Pennsylvania, have invented certain Improvements in Braking Mechanism, of which the following is a specification.

My invention is an improved braking mechanism designed more especially for use on baggage trucks.

It provides a simple and efficient brake adapted to be applied automatically when the motive power is withdrawn and to be thrown off manually as an incident of the operation.

The improvements may be used in various relations and may be operated in any manner within the scope of the invention as defined by the claims forming part of this specification.

Figure 1:
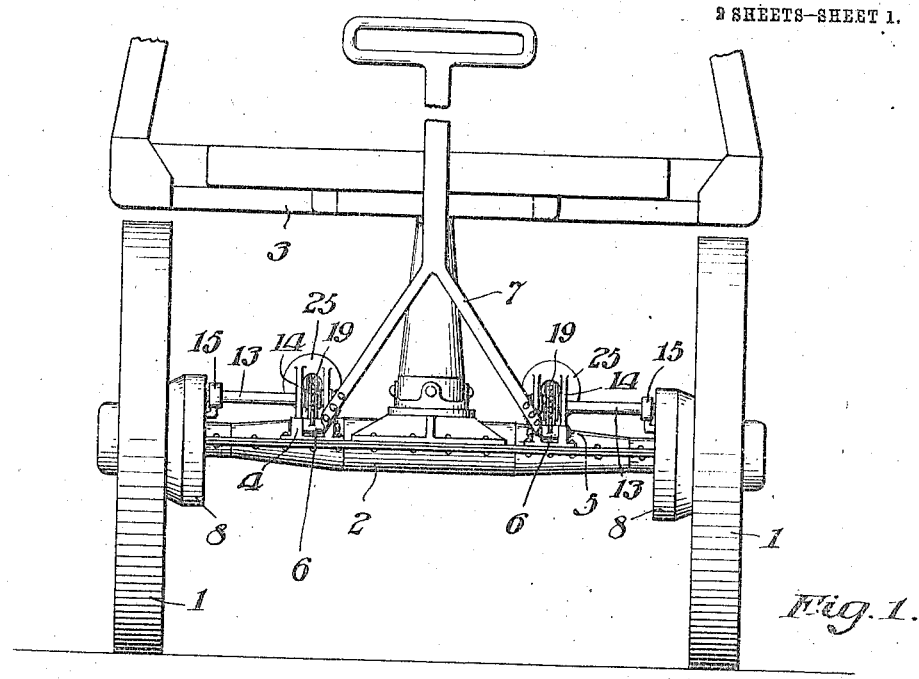
Figure 2:
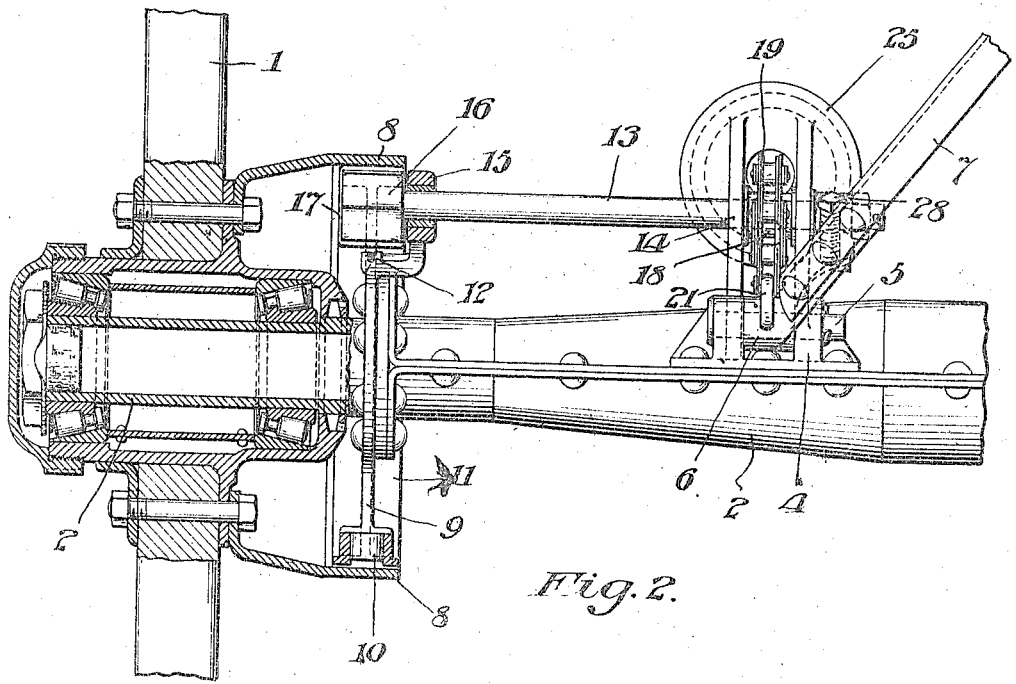
Figure 3:
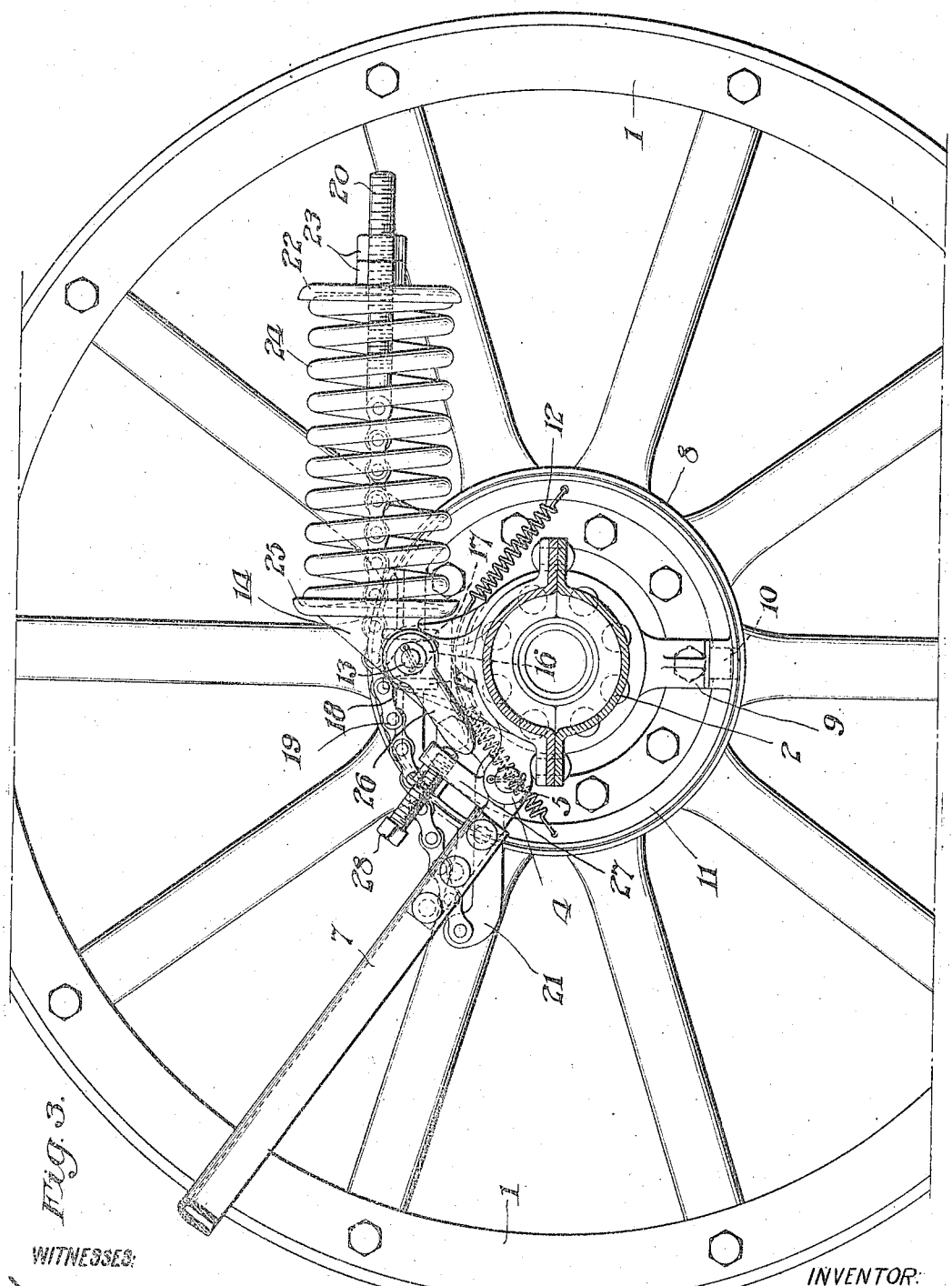

In the accompanying drawings, Figure 1 is a part elevation of a baggage truck embodying my improvements; Fig. 2 is an enlarged part sectional elevation of details of the construction shown in Fig. 1; and Fig. 3 is a part sectional elevation at right angles to the view shown in Fig. 2.

The mechanism, as illustrated in the drawings, comprises the traction wheels 1 journaled on the axle 2, which supports the body 3 and is provided with the bearings 4 for the pins 5, the latter passing through the bearings 6 of the handle or draw bar 7. The wheels 1 have the circular shells or drums 8 fixed thereto concentrically and the axle 2 has fixed thereon the yokes 9 provided with the hubs 10 on which are fixed the circular shoes 11, within the shells 8 respectively; springs 12 being drawn over the yokes and connected with the segments of the shoes on opposite sides of the hubs to draw such segments inwardly and disengage the shells.

Shafts 13, journaled in bearings 14 on the axle 2 and in bearings 15 on the yokes 9, have fixed on their outer ends the diamond shaped cams 16 which lie between and act on the bearings 17 of the shoes 11, the cams being turned by the shafts to spread the shoes and cause them to frictionally engage the shells.

Rollers 18 are mounted on the inner ends of the shafts 13 and chains 19 pass over these rollers from the bolts 20 to the arms 21 fixed to the bearings 6. The bolts 20 have bearings 22 held in adjustable position thereon by the nuts 23, and coiled springs 24 are held between the bearings 22 and bearings 25 fixed to the bearings or brackets 14. It will be seen that when the handle 7 is pulled down, the arms 21 move downwardly therewith and act through the parts 19, 20, and 22 to compress the springs 24 which, upon the release of the handle, act to elevate it.

Arms 26 are fixed on the inner ends of the shafts 13, arms 27 are fixed to the bearings 6, and set screws 28 carried by the arms 27 are adapted to engage the arms 26, when the handle is elevated to turn the shafts 13 and cause the cams 16 to spread the brake shoes 11 so as to frictionally engage the shells 8, by which the wheels are held. The force applied to operating the brakes can be regulated by adjusting the positions of the bearings 22 and the screws 28.

It will be understood that when the lever 7 is drawn down, the screws 28 are withdrawn from the arms 6, the shafts 13 are free to turn, and the springs 12 withdraw the shoes 11 from the drums or shells 8, the parts 18 turning freely toward the vertical position under the action of the parts 17 thereon.

Having described my invention, I claim:

1. A braking mechanism comprising members adapted for frictional engagement, a journaled shaft having an arm for turning it and a cam for operating one of said members, means comprising a spring for turning said arm, and a draw bar connected with said means and adapted to effect the release of said arm.

2. A braking mechanism comprising the combination with a wheel and a friction member fixed thereto, of a friction member adapted for engaging said friction member first named, a journaled shaft provided with an arm for turning it and a cam for operating said friction member second named, a lever mechanism, means comprising a spring whereby said lever mechanism is caused to act upon said arm, and manually operated means for rocking said lever mechanism, contracting said spring and disengaging said arm.

3. A braking mechanism comprising the combination with a wheel and a friction member fixed thereto, a brake shoe disposed within said member, a spring for withdrawing said shoe from said member, a journaled shaft having an arm for operating it and a cam for moving said shoe into engagement with said member, a draw bar, and means comprising a spring for elevating said draw bar and actuating said arm, said bar being adapted for operating said means to contract said spring last named and release said arm.

4. A braking mechanism comprising, in combination with an axle and a wheel revoluble thereon, a frictional braking device carried by said wheel, a frictional braking device carried by said axle, a fulcrumed draw-bar, means comprising a spring and a tension member for automatically elevating said drawbar and engaging said braking device second named with said braking device first named, and means, released by moving said draw-bar to operative position, for disengaging said braking device second named from said braking device first named.

5. A braking mechanism comprising, in combination with an axle and a wheel revoluble relatively thereto, a drum fixed to said wheel, a brake shoe adapted for engaging said drum, a cam for spreading said shoe, a journaled shaft to which said cam is fixed, a lever fulcrumed on said axle, a spring for operating said lever, and means whereby said lever operates said shaft.

6. A braking mechanism comprising, in combination with an axle and a wheel revoluble relatively thereto, a friction member fixed to said wheel, a friction member carried by said axle and adapted for engaging said friction member first named, a journaled shaft carried by said axle, a cam on said shaft and engaging said second friction member, a spring acting through said shaft to move said cam and second named friction member in one direction, and a spring for moving said second named friction member in the opposite direction.

7. A braking mechanism comprising, in combination with an axle and a wheel revoluble relatively thereto, friction members carried by said wheel and axle respectively, a lever, fulcrumed on said axle, a spring connected with and adapted to operate said lever, a cam operable by said lever for moving one of said friction members relatively to the other, and a spring connected with one of said members for moving it relatively to the other.

In testimony whereof I have hereunto set my name this 12th day of August, 1914, in the presence of the subscribing witnesses.

TRACY V. BUCKWALTER.

Witnesses:
J. F. MECK,
H. C. MINSTER.

Copies of this patent may be obtained for five cents each, by addressing the "Commissioner of Patents, Washington, D. C."